United States Patent [19]

Menzi

[11] 4,242,919
[45] Jan. 6, 1981

[54] VARIABLE SPEED TRANSMISSION OF THE FRICTION-DRIVE TYPE

[76] Inventor: Ulrich Menzi, 13, rue de Chamblon, 1400 Yverdon, Switzerland

[21] Appl. No.: 945,870

[22] Filed: Sep. 26, 1978

Related U.S. Application Data

[63] Continuation-in-part of Ser. No. 821,499, Aug. 3, 1977, abandoned.

[30] Foreign Application Priority Data

Aug. 6, 1976 [CH] Switzerland ............. 10059/76

[51] Int. Cl.³ .................................... F16H 15/26
[52] U.S. Cl. ........................................ 74/198; 74/213
[58] Field of Search ............. 74/198, 190, 194, 199, 74/200, 213

[56] References Cited

U.S. PATENT DOCUMENTS

| 910,983 | 1/1909 | Anderson | 74/198 |
|---|---|---|---|
| 1,448,490 | 3/1923 | Moakley | 74/198 |
| 2,357,035 | 8/1944 | Treese et al. | 74/198 |
| 2,444,470 | 7/1948 | Richardson | 74/193 |
| 3,004,441 | 10/1961 | Opocensky et al. | 74/198 |
| 3,097,539 | 7/1963 | Opocensky | 74/198 |
| 3,204,477 | 9/1965 | Mermelstein | 74/198 |
| 3,426,619 | 2/1969 | Weber, Jr. | 74/198 |

FOREIGN PATENT DOCUMENTS

430318 10/1911 France.
482132 1/1970 Switzerland.
165865 7/1921 United Kingdom.

*Primary Examiner*—Kenneth Dorner
*Attorney, Agent, or Firm*—Heinrich W. Herzfeld

[57] ABSTRACT

A variable speed transmission of the friction-drive type comprises a driving shaft; at least two ball-driving elements; the driving shaft having drive means associated therewith for rotation of the ball-driving elements; first torque-transmitting means connected with the driving shaft and associated with the ball-driving elements for rotating the latter in unison with the drive shaft; first ball means comprising first cage means and at least two balls each of which balls is in rolling contact with the ball-driving elements; driven-shaft means comprising at least three driven shafts disposed parallel to one another; second ball means comprising second cage means and at least two balls each of which balls is in rolling contact with two of the three driven shafts; the gap between two adjacent ones of the three driven shafts being smaller than the diameter of the respective ball being in contact with these two adjacent driven shafts.

13 Claims, 5 Drawing Figures

Fig. 4

VARIABLE SPEED TRANSMISSION OF THE FRICTION-DRIVE TYPE

RELATIONSHIP TO EARLIER APPLICATION

This application is a continuation-in-part of my pending earlier patent application Ser. No. 821,499 filed on Aug. 3, 1977, now abandoned.

BACKGROUND OF THE INVENTION

This invention relates to a variable speed transmission of the friction-drive type, comprising a driving shaft; at least two ball-driving elements; the driving shaft having drive means associated therewith for rotation of the ball-driving elements; first torque-transmitting means connected with the driving shaft and associated with the ball-driving elements for rotating the latter in unison with the drive shaft; first ball means comprising first cage means and at least two balls each of which balls is in rolling contact with the ball-driving elements; driven-shaft means; second ball means comprising second cage means; second torque-transmitting means for transmitting torque from the first ball means to the second ball means; and shifting lever means adapted for shifting the second torque-transmitting means, the first cage and the second cage.

Such variable speed transmissions are well-known, for instance from French Pat. No. 430,318, from British Pat. No. 165,865, from U.S. Pat. Nos. 1,448,490 and 2,444,470 and from Swiss Pat. No. 482,132. These transmissions permit shifting a ball or the like means on the flat surface of a disk or similar rotating mechanical element and transmission of the rolling movement of the ball to a driven shaft and comprise means for shifting the ball from a dead-center position on the disk surface (in which case the driven shaft would stand still and the driving shaft would idle) toward one side of the periphery of the disk which would cause infinitely variable increase in speed, but also a weakening of the transmitted forces. The same occurs when the ball is shifted to the opposite side, toward the periphery of the disk; however, in this case, the sense of rotation of the driven shaft is reversed.

These known transmissions suffer largely from wear, primarily on the disk surface and/or on the ball surface, whereby irregularities therof make it difficult to achieve a dead-center position of the ball on the disk and, consequently, complete standstill of the driven shaft. Also, the force needed for maintaining or for shifting speed increases in proportion to the load and adds to wear of all parts.

Moreover, in order to obtain satisfactory operation, parts such as in particular the disk and ball must be manufactured and assembled with high precision. A minute deviation of the ball-contacting surface of the disk from the vertical position of the shaft bearing the disk in the supporting means needed will lead to serious irregularities contributing to rapid wear.

OBJECTS AND SUMMARY OF THE INVENTION

Objects of the invention are to provide a variable speed transmission of the initially described type which is at least substantially free from the drawbacks of the known transmissions, which is particularly of low wear both when the transmission transmits torque from the driving shaft to the driven shaft and when the driving shaft idles, which is moreover relatively insensitive to minor irregularities of manufacture, and in which the pressure exercised during idling on the moving parts is considerably smaller than when torque is transmitted to the driven shaft.

It is a further object of the invention to provide a variable speed transmission of the initially described type in which shifting to different speeds requires relatively little force and wherein it is nevertheless easy to shift the transmission into neutral.

These objects are attained, in accordance with the invention, in a machine of the initially described type, in which the driven-shaft means comprise at least three driven shafts disposed parallel to one another, and the second ball means comprise at least two balls each of which balls is in rolling contact with two of the three driven shafts, one of the two balls of the second ball means being in rolling contact with a middle one and a second one of the three driven shafts, and the other ball of the second ball means being in rolling contact with the middle driven shaft and with the third one of the three driven shafts; the gap between two adjacent ones of said three driven shafts being smaller than the diameter of the ball being in contact with these two adjacent driven shafts.

Moreover, the shift of the second torque-transmitting means, when being shifted by the shifting lever means, should be larger than the shift of the said first and second cages.

Preferably, the aforesaid first torque-transmitting means are chain-drive means imparting during operation an additional bias to the driving disks, thereby increasing contact pressure of the driving disks on the said balls. The drive means of each disk preferably comprise a disk shaft rotatably mounted in the supporting lever.

The second torque-transmitting means preferably comprise a group of at least two cylinders arranged in parallel, each of the balls being in contact with two of the cylinders of the said group; the group is displaceable, due to a rolling movement of the said balls, in the direction of the axes of the said cylinders transverse to the plane in which the supporting levers can be swivelled. The second torque-transmitting means can further comprise a set of ball means, each of which is in rolling contact with two of the cylinders, on the one hand, and with the driven shaft means, on the other hand. The driven shaft means can comprise a driven shaft and two auxiliary shafts arranged in parallel on opposite sides of the driven shaft; and the said set of ball means then comprises at least two balls, each of which contacts with its upper half two of the said cylinders, and with its lower half the driven shaft and one of the two auxiliary shafts.

The second torque-transmitting means preferably comprise a group of at least three cylinders arranged in parallel, and each of the balls of the first ball means are in contact with two of the cylinders of the said group, the group being displaceable due to a rolling movement of the said balls of the first ball means; this displacement is in the direction of the axes of the cylinders transverse to the plane in which the ball-driving elements are disposed. The at least two balls of the second ball means are each in contact with its upper half with two of the aforesaid cylinders. Preferably, the axes of said cylinders are parallel to the axis of the driven shaft.

The shifting lever means preferably comprise a first shifting lever and first pivot means which extend with their axes transversely to the cylinders of the aforesaid group and have the first shifting lever pivotally mounted thereon, and first peg means mounted on the cage of the first ball means protruding therefrom parallel to the said pivot means and articulatedly engaging the first shifting lever, whereby, upon swivelling of the first shifting lever about the first pivot means, the said first shifting lever moves the last-mentioned cage and the balls therein by means of the first peg means in a direction parallel to the axes of the cylinders of the aforesaid group of the second torque-transmitting means.

This group of cylinders also comprises a frame laterally surrounding the said cylinders, second pivot means on the inside of the said frame and second peg means on the outside of the said frame. Both the second pivot means and the second peg means extend from the cylinder frame transverse to the axes of the cylinders. A second shifting lever is pivotally mounted at its upper end region on the said second pivot means, while the second peg means shiftably engage the lower end of the first shifting lever. The cage of the second ball means comprises third peg means protruding therefrom transversely to the axes of the said cylinders and engaging the second shifting lever in a middle region thereof. The shifting lever means further comprise stationary pivot means distanced downwardly from the third peg means; and the second shifting lever has an elongated slit at its lower end, which slit is slidably and rotatably engaged by the stationary pivot means. The centers of all of the balls of the first ball means are preferably disposed in a first plane, while the centers of the balls of the second ball means are in a plane below and parallel to the said first plane.

In a preferred embodiment of the transmission according to the invention, the number of the first torque-transmitting means and of the ball-driving elements is each four and the number of balls of the first ball means is also four. Preferably, in the same embodiment, the number of cylinders in the aforesaid group is three, and the cylinders are arranged in a plane with one of them as the central cylinder, and said ball-driving elements and the first torque-transmitting means as well as the first ball means are each arranged in pairs, one pair on one side, and the other pair on the opposite side, of the driving shaft, one of the pairs of the first torque-transmitting means being biassed to swivel toward the other pair, and the two balls of the pair of the first ball means associated with the former pair of the first torque-transmitting means being in rolling contact between the central cylinder and one of the other cylinders, and the two balls associated with the other pair of the first torque-transmitting means being in rolling contact with the central cylinder and the other outer cylinder.

In a further preferred embodiment, the ball-driving elements comprise two ball-driving disks and the first torque-transmitting means comprise at least two supporting levers mounted on opposite sides of driving shaft, each of these supporting levers being adapted to be swivelled with one of its ends towards and away from the driving shaft and the corresponding end of the other lever; and each of these supporting levers bears one of the said driving disks. The first torque-transmitting means can further comprise chain-drive means imparting during operation an additional bias to these driving disks, thereby increasing contact pressure of the driving disks on the balls of the first ball means. The drive means can comprise a disk shaft for each disk, which disk shaft is rotatably mounted on the respective supporting lever bearing the disk. There can also be provided tensioning means engaging the supporting levers and biassing them so as to impart contact pressure to the driving disks on the balls of the first ball means.

BRIEF DESCRIPTION OF THE DRAWINGS

A preferred embodiment of the variable-speed transmission according to the invention and variations of minor features thereof shall now be explained in more detail with reference to the accompanying drawings in which.

DETAILED DESCRIPTION OF THE EMBODIMENT SHOWN IN THE DRAWINGS

The embodiment of a transmission shown in the drawings comprises a housing 1 having two side walls 26, two frontal end walls 80, a bottom wall 88 and two transverse walls 25 for stiffening the housing 1. Transverse walls 25 are mounted by screw connections 27 in the upper end regions of side walls 26.

The drive shaft 10 is supported in a ball bearing 19 (FIG. 3) and in a friction bearing 16. Ball bearing 19 is mounted in a cage 19a which is in turn rigidly mounted in a bridge 18. The latter is screw-connected to the top ends of transverse walls 25 by means of fastening screws 18a. Drive shaft 10 has an axial groove 81 in which are engaged for rotation therewith an upper sprocket ring 2 and a lower sprocket ring 20.

At its innermost end, drive shaft 10 is supported in a friction bearing 16 which is rigidly mounted in the center of a platform 17, which latter is held in place at an intermediate level of transverse walls 25 by means of screw-connections 17a. Sprocket rings 2 and 20 serving as drive means are held in axial distance from one another and from cage 19a of ball bearing 19 on shaft 10 by means of distancing collars 2a, 20a and 20b.

Transverse walls 25 have adjacent housing side walls 26, downwardly extending portions 25a and 25b in which are rotatably mounted two shafts 23 and 24.

On shaft 23 there are mounted two angular clamping levers 11 and 12 with their lower end portions 11a and 12a, and on shaft 24 there are mounted two similar clamping levers 13 and 14, with their respective lower end portions 13a and 14a.

These clamping levers serve as supporting levers for the ball-driving elements, to be described in detail hereinafter, during the engagement of the latter by first torque-transmitting means comprising sprocket chains 3 and 4. The other ends of these levers form arms 11b, 12b, 13b and 14b projecting inwardly toward the driving shaft 10 at a level just above a bridge 18 mounted above platform 18 on top of walls 25.

Figure 3:
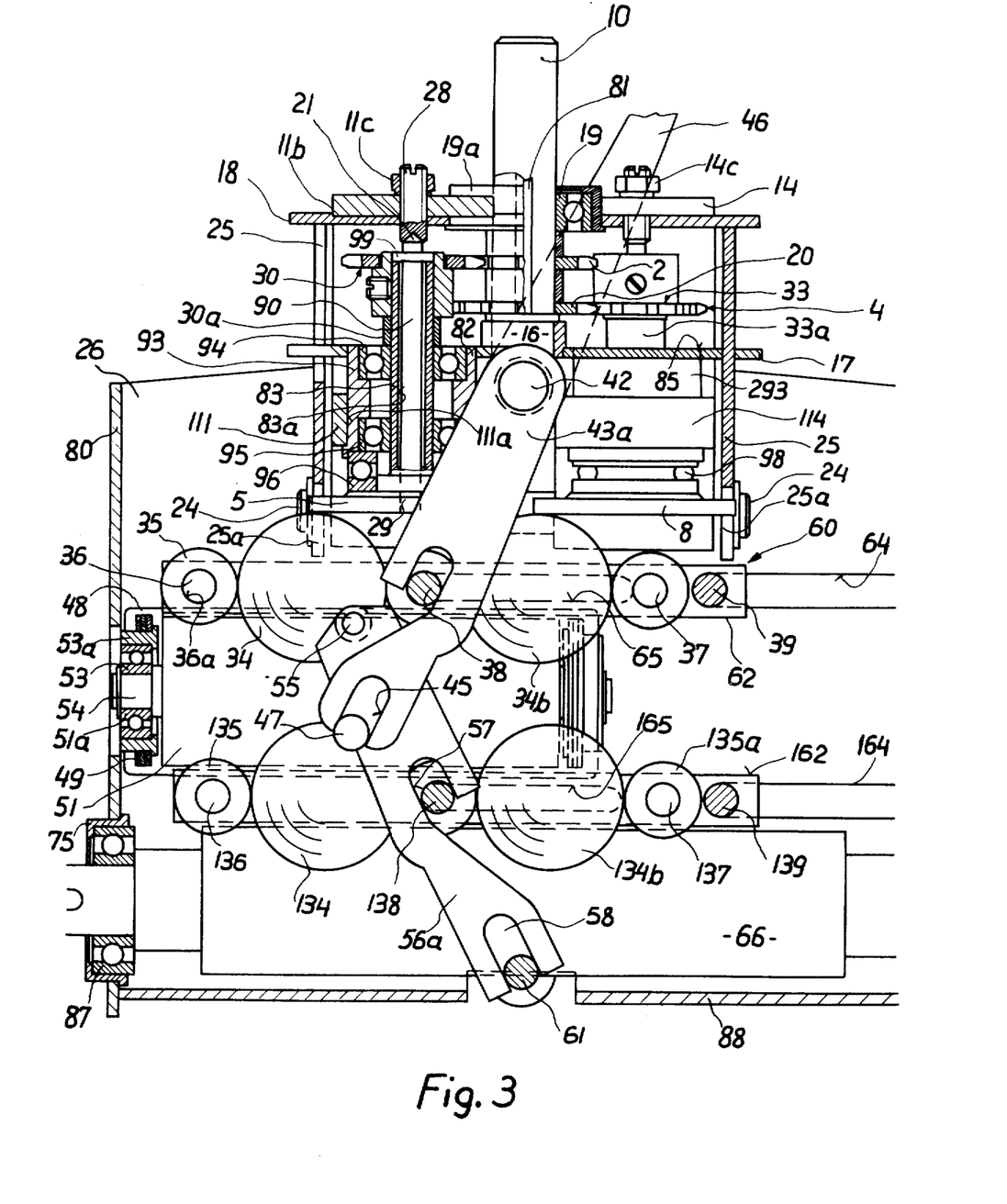
FIG. 3 is a lateral view of the same embodiment, partially in section, taken along the plane indicated by III—III in FIG. 2.
Figure 4:
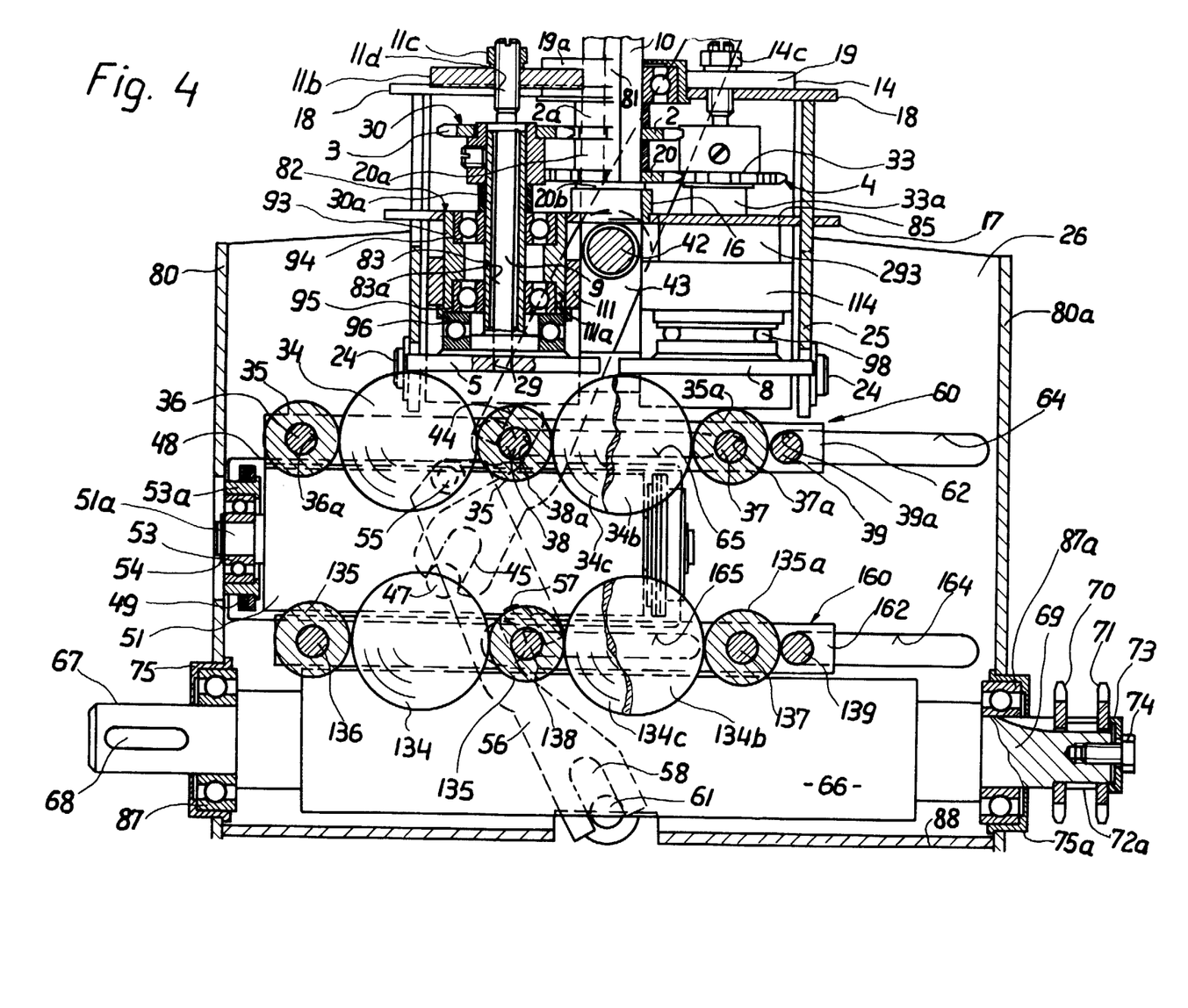
FIG. 4 is an axial sectional view, taken along the plane indicated by IV—IV in FIGS. 1 and 2, with a small variation of the disk-supporting means.

A first tension spring 131 is fastened by means of clamping nuts 11c and 13c to the free ends of lever arms 11b and 13b, exerting a pull on levers 11 and 13 towards each other. Similarly, a tension spring 132 is connected by means of clamping nuts 12c and 14c to the free ends of lever arms 12b and 14b, exerting a pull on levers 12 and 14 toward each other. Levers 11 and 12, on the one hand, and 13 and 14, on the other hand, bear on their inside faces, turned toward the other lever of the respective pair, lugs 111, 112, 113 and 114, each of which lugs has an orifice or eyelet, of which only eyelet 111a is shown in FIGS. 3 and 4. In these eyelets, there are rigidly mounted the ball-bearing cages, of which only cage 93 mounted in eyelet 111a is shown in axial section in FIGS. 3 and 4. Cage 93 contains an upper and a lower ball bearing 94 and 95, respectively, which radially support a hollow shaft 83, and an axial ball-bearing 96 supporting axially the same hollow shaft 83. On the lower end of hollow shaft 83, there is rigidly mounted a driving disk 5 for rotation therewith. Similarly, driving disks 6, 7 and 8 are mounted by means of their hollow disk shafts (not shown) in two radial and one axial ball bearings, of which only axial ball bearing 98 supporting the hollow shaft of disk 8 is visible in FIGS. 3 and 4.

Hollow shaft 83, which bears at its lower end disk 5, bears at its upper end sprocket wheel 30, sprocket wheel 31 is borne on the same hollow shaft (not visible) which bears disk 6, sprocket wheel 32 is borne on the same hollow shaft (not visible) as disk 7, and sprocket wheel 33 is borne on the same hollow shaft (not visible) as disk 8.

Thus, there are pvovided four ball-driving elements for driving balls 34, 34a, 34b and 34c, as will be described hereinafter, each of which ball-driving elements comprises a hollow shaft bearing at its one end and a sprocket wheel engaging one of the above-mentioned chains 3 and 4, and at its other end a driving disk, the underside of which is in driving contact with one of the aforesaid four balls.

Sprocket wheels 30 and 32 are in engagement with upper sprocket ring 2, being coupled therewith by means of upper sprocket chain 3, while sprocket wheels 31 and 33 engage the lower sprocket ring 20, being at the same lower level as the latter, the engagement for rotation with drive shaft 10 being by means of lower sprocket chain 4.

Figure 2:
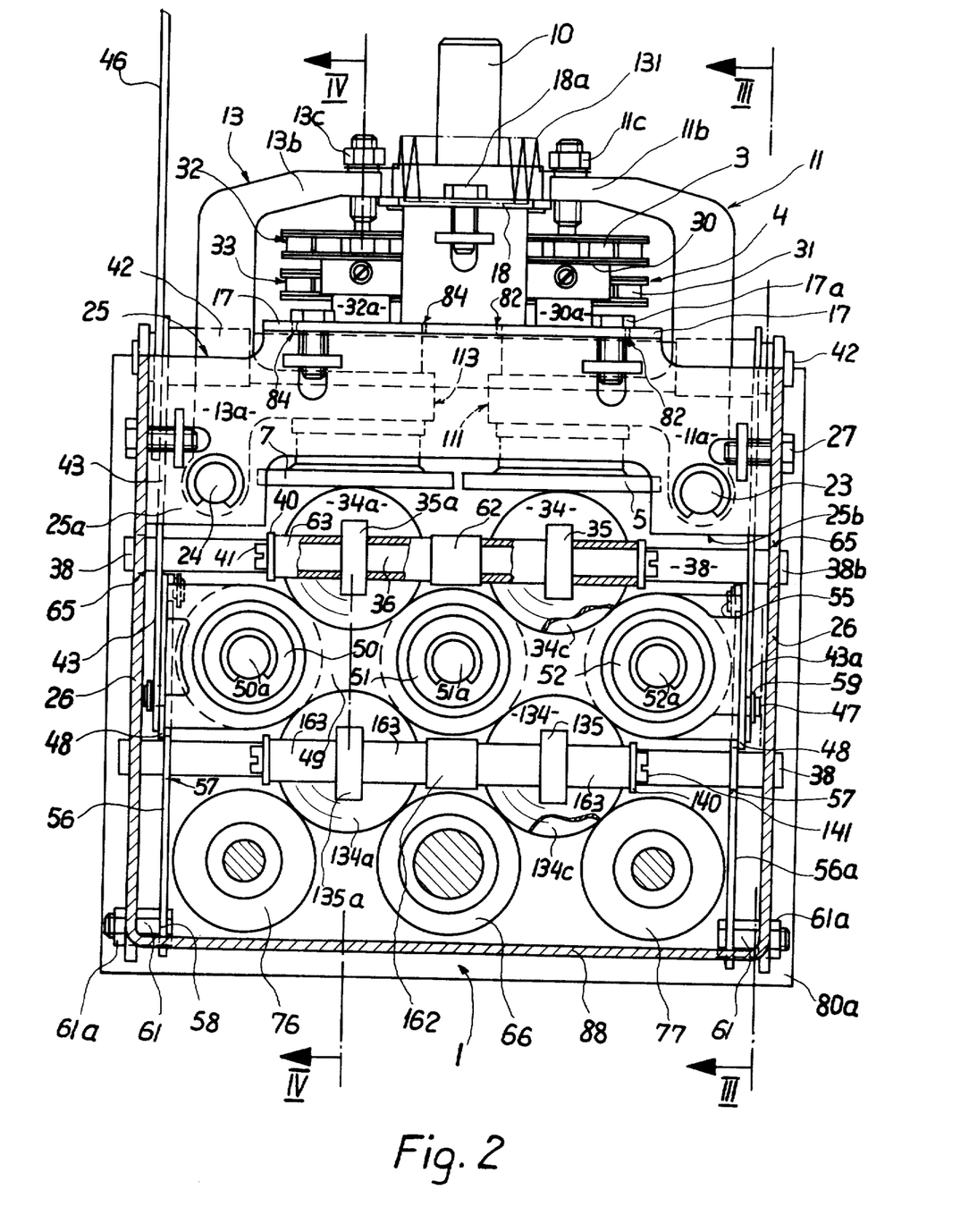
FIG. 2 is a frontal view of the embodiment of FIG. 1, partially in section, taken along the plane indicated by II—II in FIG. 1.

Sprocket wheel 30 is supported on ball bearing 94 by means of a distancing collar 30a, the other sprocket wheels are supported on the respective upper radial bearings of their hollow shafts by means of similar distancing collars, of which collar 32a, supporting sprocket wheel 32, is shown in FIG. 2 and collar 33a supporting sprocket wheel 33 is visible in FIG. 4, while the distancing collar supporting sprocket wheel 31 is not visible, being hidden behind distancing collar 30a in FIG. 2.

These distancing collars pass through elongated slots provided in platform 17; e.g. the width of slot 82, which is indicated below sprocket wheel 30 in FIG. 3 and through which cage 93 distancing collar 30a passes, corresponds closely to the diameter of cage 93, leaving little play therebetween, in the direction transverse to the direction in which tension spring 131 extends, i.e. the direction parallel to the front edge of lever arms 11b and 13b. On the other hand, slot 82 is elongated in the direction in which tension spring 131 extends, thus permitting slight tilting of lever 11 and, together therewith, of the whole assembly of parts bearing disk 5. Similarly, slot 84 in platform 17 underneath sprocket wheel 32 is also elongated in the same direction in which spring 131 extends, and cage 193 supporting driving disk 7 is slightly tiltable in slot 84 when lever 13 is tilted.

Similarly, cage 293 which supports disk 8 is tiltable in a corresponding elongated slot 85 indicated in FIGS. 3 and 4 underneath sprocket wheel 33.

Figure 2A:
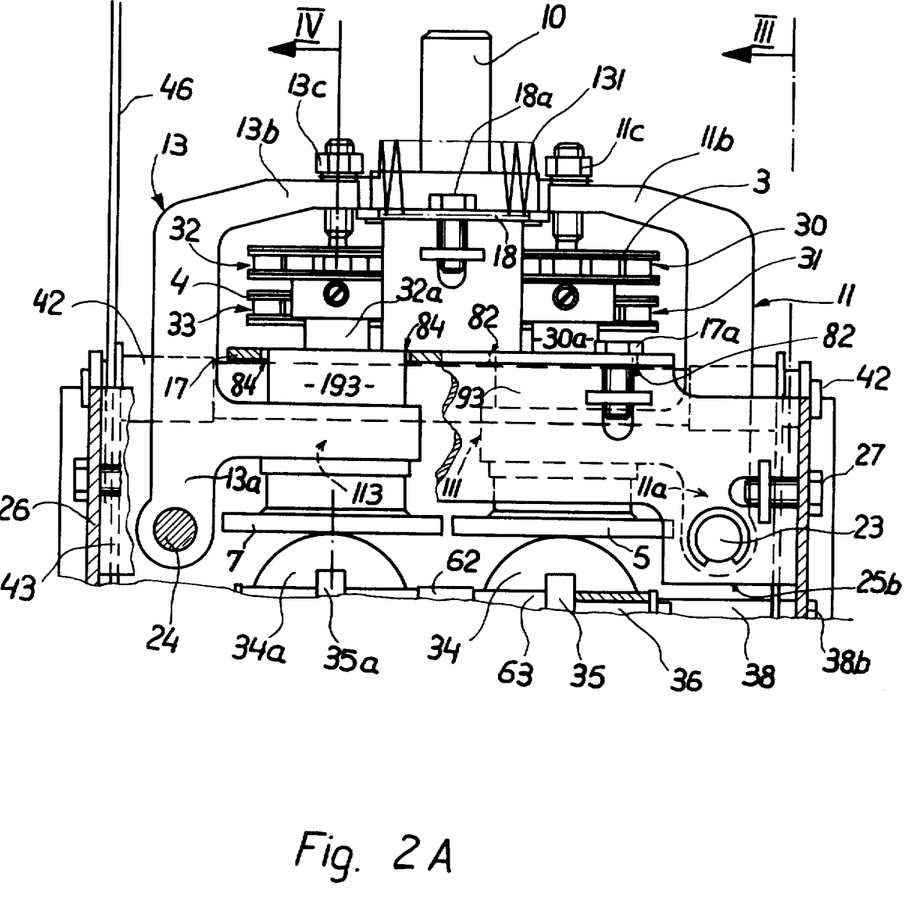
FIG. 2A shows the same view as the right half of FIG. 2, while the left half is taken along a plane designated by IIA—IIA in FIG. 1.

The fourth elongated slot, underneath sprocket wheel 31, cannot be seen in FIG. 2A, because it is hidden behind the corresponding parts underneath sprocket wheel 30, tiltable in slot 82, and it is not visible in FIG. 4, being located in front of the plane IV—IV (FIG. 3).

The hitherto described drive system thus comprises two symmetrical chain drives, both driven in unison from drive shaft 10, one of these chain drives, comprising sprocket chain 3, being provided in an upper plane in which sprocket ring 2 is located, and the other chain drive, comprising sprocket chain 4, being provided in a lower plane in which sprocket ring 20 is located.

In the bore 83a of hollow shaft 83, there is housed a rod 9 serving as disk shaft for disk 5 which is mounted stationary therein, ending flush with the lower face of disk 5 through which disk it extends by way of a central hole 29 of disk 5. At its upper end, rod 9 extends through a threaded bore 11d in lever arm 11b, protruding upwardly from the latter and bearing on its threaded upper end the clamping nut 11c. By means of its transversely grooved upper end, rod 9 can be turned in bore 11a and the height of rod 9 can be finely adjusted to make its lower end exactly flush with the underside of disk 5. The adjusted rod 9 can then be locked in position by means of nut 11a (FIG. 4).

Figure 1:
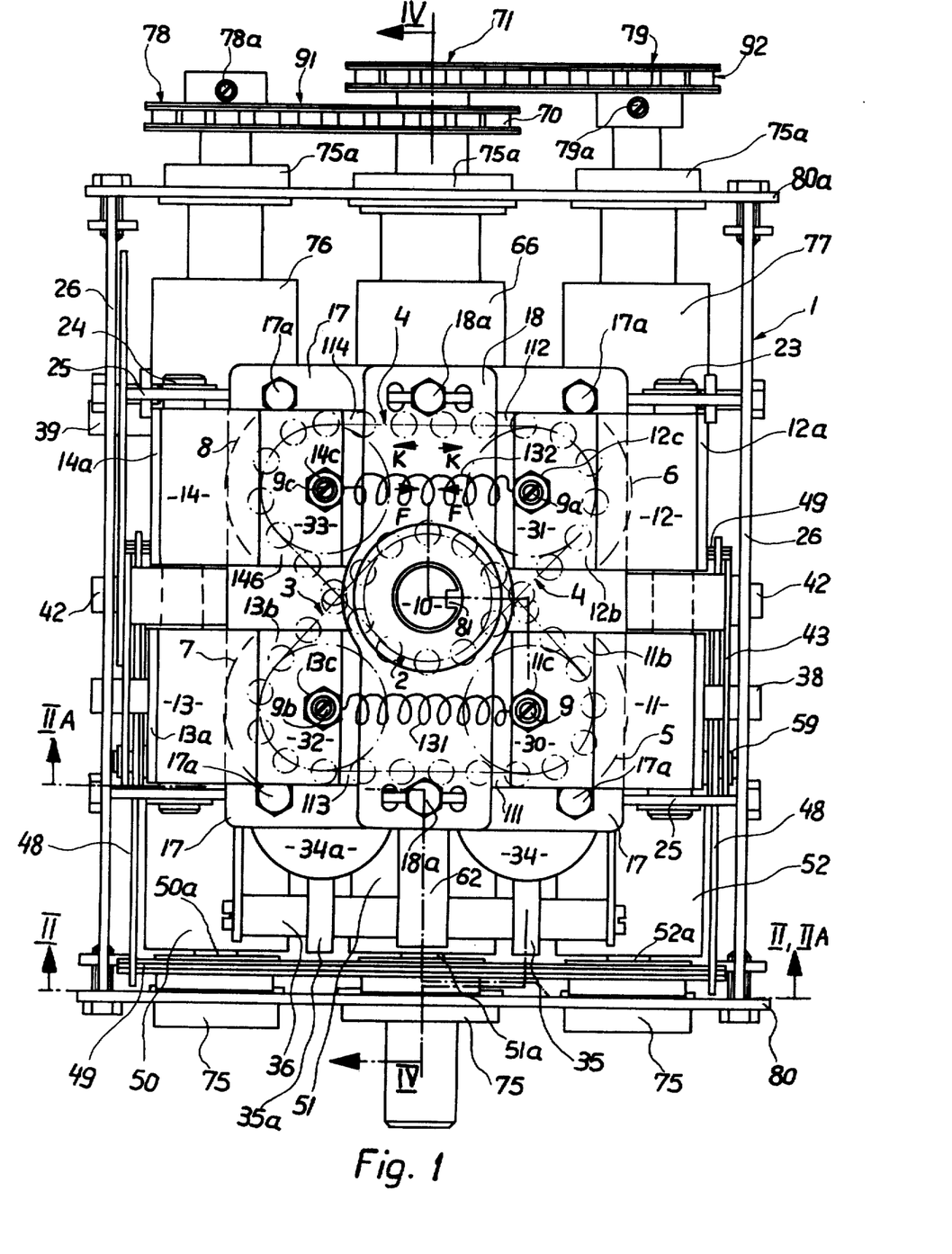
FIG. 1 is a plan view of the preferred embodiment.

Corresponding rods 9a, 9b and 9c protrude from lever arms 12b, 13b and 14b (FIG. 1) and serve as disk shafts for disks 6, 7 and 8.

This adjusting rod assembly is modified in FIG. 3. Herein, the rod 90 also ends flush with the underside of disk 5, extending through central hole 29 of the latter; however, at its upper end it is pivotally mounted in a recess at the lower end 21 of an adjusting bolt 28 which bears an external thread and is screwed into the threaded bore 11d in the same manner as rod 9. Rod 90 is prevented from falling out of the central axial bore 83a of hollow shaft 83, by a flange 99 provided near the upper end of rod 90 and resting on the upper rim of hollow shaft 83.

Underneath driving disks 5, 6, 7 and 8 there are disposed the above-mentioned four balls, the underside of disk 5 resting on a first ball 34, a second ball 34c (FIG. 4) resting in driving contact upon disk 6, a third ball, 34a, in contact with driving disk 7, and the fourth ball, 34b, in contact with driving disk 8.

It is well known that the distance of the contact point between the ball 34 and the underside of the disk 5 from the center of the disk determines the ratio between the speed at which the ball rotates and the r.p.m. of the disk which latter depends on the r.p.m. of the drive shaft.

Minute irregularities in the shape of the ball surface or the underside of the disk or in the positioning of the disk underside relative to the disk shaft which irregularities may be caused or aggravated by wear are equalized by a corresponding minute tilting of the levers 11, 12, 13 and/or 14.

Moreover, the action of the springs 131 and 132 tilting the upper end of rod 9 slightly toward the upper end of rod 9b and thereby causing a minute tilting of disk 5, supplies a part of the contact-making pressure N between the disk 5 and the ball 34. This contact-making pressure is even present when the driving shaft 10 idles, i.e. when there is no transmission of power to the driven shaft 66. In operation, however, this contact-making pressure is increased by a component which is proportionate to the driving torque of the transmission; for, the chain tension K generates forces F, acting in the direction of the elongated slots 82, 84, 85 or the fourth slot (not visible in the drawings), increases the contact-making pressure N proportional to the torque.

The feature that the pull of the chains ceases when the drive shaft idles, saves the balls 34, 34a, 34b and 34c from a considerable amount of wear.

The four balls 34, 34a, 34b and 34c constitute a driving ball set which is guided in a cage 60 in order to maintain spacing. The cage 60 consists of a central bar 62 having four transverse bores 36a, 37a, 38a and 39a, in which there are press-fitted the guiding shafts 36, 37, 38 and 39. These shafts carry three loose rollers 35, holding between them balls 34 and 34c and three loose rollers 35a holding between them balls 34a and 34b, practically free of play. The guide shafts 36, 37, 38 and 39 bear at their two ends lateral casing bars 40 which are screwed down thereon by means of threaded bolts 41. Each of the rollers 35 or 35a is prevented from axial displacement by means of distancing sleeves 63 extending between the central bar 62 and one side of the respective roller and between the other side of the latter and lateral bar 40. The central shaft 38 is longer than shafts 36 and 37 and its two ends are guided in horizontal elongated slots 65 in the opposite sidewalls 26 of housing 1. The shaft 39 extends beyond shorter shaft 37 and its two ends are guided in a horizontal elongated slot 64 in opposite side walls 26 of housing 1. The cage 60 with the shafts 36, 37, 38 and 39 and the balls therebetween can thus be displaced horizontally by the length of elongated slots 64 and 65.

In the upper part of the housing 1, a shaft 42 is disposed parallel to the shafts of cage 60 passing underneath the platform 17 and between pairs of levers 11 and 12, on the one side, and 13 and 14, on the other side, the free ends of shaft 42 being supported rotatably in the opposite side walls 26 of the housing 1. Shaft 42 bears shift levers 43 and 43a positively connected thereto for rotation therewith. Levers 43 and 43a are each provided with slits 44 in an intermediate zone and slits 45 at the lower end of each lever. The ends of shaft 38 engage the slits 44 of levers 43 and 43a.

The upper ball set in cage 60 rests on a horizontally displaceable group of three cylinders 50, 51 and 52 which are supported respectively at their frontal ends by means of trunnions 50a, 51a, 52a in ball bearings 53 (FIG. 4), the bushings 53a of which are mounted in packs 49 of transverse plates, which packs 49 are in turn supported in two ledges 48 extending inside and parallel to side walls 26 at a short distance from the latter. Packs 49 preferably consist of three plates which are minutely slidable on each other, thus permitting a minimal bending of the packs. Pegs 47 are firmly riveted on the outer sides of ledges 48 and engage each a slit 45 on one of levers 43 and 43a. On their inner sides, ledges 48 have riveted pegs 55 thereto, each of which bears rotatably a lever 56, 56a having a slit 57 in a middle region and a slit 58 at its lower end.

A lower ball set having also four balls 134, 134a, 134b and 134c which are held in a cage 160 with spacing shaft 136, 137, 138 and 139 and six loose rollers in sets of three, 135 and 135a, is of identical structure with the upper ball set in cage 60 and supports the cylinders 50, 51 and 52. The central shaft 138 of this set engages the slits 57 of levers 56 and 56a. Bolts 61 are fastened by means of nuts 61a at the side walls 26 above the bottom wall 88 of housing 1 and project inwardly into the latter a short distance to engage slits 58 of levers 56 and 56a, serving as fulcrums for the latter. The lower ball set rests with the lower halves of its four balls laterally on a centrally disposed driven shaft 66 and to outer shafts 76 and 77, which are all three supported by means of ball bearings 87 and 87a via their bushings 75 and 75a, respectively, in the frontal end walls 80 and 80a of housing 1. The one end 69 of the driven shaft 66 protruding from ball bearing 87a is provided with an inner sprocket ring 70 and an outer sprocket ring 71, each of which is anchored in the shaft by means of a key groove 72 and is axially held therein by means of a fastening disk 73 and screw 74, as well as by a distancing sleeve 72a lodged between the sprocket rings 70 and 71. Each of the auxiliary shafts 76 and 77 wears at its free end protruding from its respective bushing 75a, a sprocket wheel 78 and 79. These sprocket wheels 78 and 79 are fixedly mounted on their respective shafts 76 and 77 by means of fastening screws 78a and 79a.

Sprocket ring 70 and sprocket wheel 78 are connected with each other by a sprocket chain 91, and sprocket ring 71 and sprocket wheel 79 are connected with one another by means of a sprocket chain 92, whereby the driven shaft 66 and the two auxiliary shafts 76 and 77 are all three driven in unison.

When the driving shaft 10 drives the disks 5, 6, 7 and 8 via sprocket chains 3 and 4, the rotation of these disks is transmitted by friction to the upper set of balls 34, 34a, 34b and 34c. The latter in turn cause rotation of the cylinders 50, 51 and 52 of the horizontally displaceable intermediary cylinder group. The rotation of cylinders 50, 51 and 52 is taken up by the balls 134, 134a, 134b and 134c of the lower ball set, and transmitted by the latter directly, and via auxiliary shafts 76 and 77 and chains 91 and 92 indirectly, to driven shaft 66.

A variation of the transmission ratio is effected by shifting the handlepart 46 which is rigidly connected with the upper end of lever 43. The resulting shift of levers 43 and 43a horizontally displaces the set of upper driving balls 34 to 34c together with their cage 60 and, consequently, causes the balls to roll on the undersides of driving disks 5 to 8 to a different contact point.

The distance between shaft 38 and peg 47 is so chosen that only rolling takes place between the driving cylinders 50 to 52 and the upper balls 34 to 34c. The horizontal displacement of the set of cylinders 50 to 52 due to engagement of pegs 47 in the slits 45 of levers 43 and 43a also causes a shifting movement of levers 56 and 56a about pegs 55, which pegs are horizontally displaced together with the set of cylinders 50 to 52; this causes the slit 58 at the lower end of levers 56 and 56a to move relatively to bolts 61, the latter penetrating more deeply into slits 58 when lever 56 is moved to a more vertical position, and vice-versa.

The perpendicular distances from peg 55 to bolt 61 and from each of these pegs to shaft 38 are also so chosen that only rolling displacement takes place between the set of lower balls 134 to 134c and the set of cylinders 50 to 52 on the one hand, and between the set of lower balls 134 to 134c and the group of shafts consisting of driven shaft 66 and auxiliary shafts 76 and 77, on the other hand. The provision of two times three loose rollers 35, 35a in upper ball cage 60 and corresponding loose rollers 135 and 135a in lower ball cage 160 contributes to a reduction of the force necessary to effect shifting.

A displacement of the balls 34 to 34c from the periphery toward the center of the driving disks 5 to 8 causes a reduction of the transmission ratio. When the balls contact the lower ends of rods 9 to 9c, there is no transmission of torque to the driven shaft 66 and the auxiliary shafts 76 and 77, i.e. the latter three shafts stand still. When shifting takes place from the position of the balls 34 to 34c shown in FIG. 4 through the last-mentioned position, in which the driving shaft 10 idles, to the opposite side of the driving disks 5 to 8, the direction of rotation is reversed.

In view of the fact that variation of the transmission ratio causes only rolling effects, materials having a high friction coefficient such as ebonite (hard caoutchouc) can be used for all rolling transmission elements. This permits building of friction drive systems capable of transmitting large torques.

I claim:

1. A variable speed transmission of the friction-drive type, comprising:
    (a) a driving shaft and drive means mounted thereon;
    (b) at least two ball-driving elements;
    (c) first torque-transmitting means connected with said drive means of said driving shaft and associated with said ball-driving elements for rotating the latter in unison with said drive shaft;
    (d) first ball means comprising first cage means and at least two balls each of which balls is in rolling contact with said ball-driving elements;
    (e) driven-shaft means comprising at least three driven shafts disposed parallel to one another;
    (f) second ball means comprising second cage means and at least two balls each of which balls is in rolling contact with two of said three driven shafts; one of said two balls of said second ball means being in rolling contact with a middle one and a second one of said three driven shafts, and the other ball of said second ball means being in rolling contact with said middle driven shaft and with the third one of said three driven shafts; the gap between two adjacent ones of said three driven shafts being smaller than the diameter of the ball being in contact with these two adjacent driven shafts;
    (g) second torque-transmitting means for transmitting torque from said first ball means to said second ball means; and
    (h) shifting lever means engaging and being adapted for shifting said second torque-transmitting means, said first cage and said second cage, the shift of said second torque-transmitting means being larger than the shift of said cages.

2. A variable speed transmission as described in claim 1, wherein said second torque-transmitting means comprise a group of at least three cylinders arranged in parallel, each of said balls of said first ball means being in contact with two of the cylinders of said group, said group being displaceable due to a rolling movement of said balls of said first ball means, said displacement being in the direction of the axes of said cylinders transverse to the plane in which said ball-driving elements are disposed.

3. A variable speed transmission as described in claim 2, wherein the at least two balls of said second ball means are each in contact with its upper half with two of said cylinders.

4. A variable speed transmission as described in claim 2, wherein said shifting lever means comprise a first shifting lever and first pivot means extending with their axis transversely to said cylinders and having said first shifting lever pivotally mounted thereon, and first peg means mounted on said first cage means protruding therefrom parallel to said pivot means and articulatedly engaging said first shifting lever, whereby, upon swivelling of said first shifting lever about said first pivot means, said first shifting lever moves said first cage means and balls therein by means of said first peg means in a direction parallel to the axes of said cylinders.

5. A variable speed transmission as described in claim 2, wherein said group of cylinders comprises a frame laterally surrounding said cylinders, second pivot means on the inside of said frame and second peg means on the outside of said frame, both said second pivot means and second peg means extending therefrom transverse to the axes of said cylinders, and said shifting lever means comprise a second shifting lever pivotally mounted at its upper end region on said second pivot means, said second peg means shiftably engaging the lower end of said first shifting lever, and wherein said second cage means comprise third peg means protruding therefrom transversely to the axes of said cylinders and engaging said second shifting lever in a middle region thereof, and said shifting lever means comprise stationary pivot means distanced downwardly from said third peg means; said second shifting lever having an elongated slit at its lower end, said slit being slidably and rotatably engaged by said stationary pivot means.

6. A variable speed transmission as described in claim 3, wherein the axes of said cylinders are parallel to the axis of said driven shaft.

7. A variable speed transmission as described in claim 6, wherein the centers of all of said balls of said first ball means are in a first plane, and wherein the centers of the balls of said second ball means are in a plane below and parallel to said first plane.

8. A variable speed transmission as described in claim 2, wherein the number of said first torque-transmitting means and ball-driving elements is each four and the number of balls of said first ball means is also four.

9. A variable speed transmission as described in claim 8, wherein the number of cylinders in said group is three, said cylinders being arranged in a plane with one of them as the central cylinder, and said ball-driving elements and said first torque-transmitting means and first ball means are arranged in pairs, one pair on one side, and the other pair on the opposite side, of said driving shaft, one of the pairs of said first torque-transmitting means being biassed to swivel toward the other pair, and the two balls of the pair of said first ball means associated with the former pair of said first torque-transmitting means being in rolling contact between the central cylinder and one of the outer cylinders, and the two balls associated with the other pair of said first torque-transmitting means being in rolling contact with said central cylinder and the other outer cylinder.

10. A variable speed transmission as described in claim 1, wherein said ball-driving elements comprise two ball-driving disks, and said transmission further comprises at least two supporting levers mounted on opposite sides of said driving shaft for supporting said ball-driving elements during their engagement by said first torque-transmitting means, and each of said suppporting levers being adapted to be swivelled with one of its ends towards and away from said driving shaft and the corresponding end of the other lever, each of said supporting levers bearing one of said driving disks.

11. A variable speed transmission as described in claim 10, wherein said first torque-transmitting means further comprise chain-drive means imparting during operation an additional bias to said driving disks, thereby increasing contact pressure of said driving disks on said balls of said first ball means.

12. A variable speed transmission as described in claim 11, wherein said ball-driving elements comprise a disk shaft for each disk, said disk shaft being rotatably mounted in one of said supporting levers.

13. A variable speed transmission as described in claim 10, further comprising tensioning means engaging said supporting levers and biassing them so as to impart contact pressure to said driving disks on said balls.

* * * * *